(12) United States Patent  (10) Patent No.: US 9,159,507 B2
Mueller et al.  (45) Date of Patent: Oct. 13, 2015

(54) BICYCLE HANDLE SYSTEM

(71) Applicant: RTI Sports Vertrieb von Sportartikeln GmbH, Koblenz (DE)

(72) Inventors: Michael Mueller, Siershahn (DE); Andreas Krause, Koblenz (DE)

(73) Assignee: RTI SPORTS VERTRIEB VON SPORTARTIKELN GMBH, Koblenz (DE)

(*) Notice: Subject to any disclaimer, the term of this patent is extended or adjusted under 35 U.S.C. 154(b) by 0 days.

(21) Appl. No.: 14/211,856

(22) Filed: Mar. 14, 2014

(65) Prior Publication Data

US 2014/0260754 A1  Sep. 18, 2014

(30) Foreign Application Priority Data

Mar. 15, 2013 (DE) .................. 20 2013 002 490 U

(51) Int. Cl.
*B62M 6/45* (2010.01)
*B62K 23/04* (2006.01)
*H01H 3/04* (2006.01)
*H01H 9/06* (2006.01)

(52) U.S. Cl.
CPC ............... *H01H 3/04* (2013.01); *B62K 23/04* (2013.01); *B62M 6/45* (2013.01); *H01H 2009/068* (2013.01); *Y10T 74/2028* (2015.01)

(58) Field of Classification Search
CPC ........ B62K 23/02; B62K 23/04; B62K 23/06; B62K 2204/00; B62M 6/15; B62M 6/45; B62M 6/50; H01H 2009/068
USPC ................. 180/315, 206.1–206.3; 200/61.54; 74/488, 551.9
See application file for complete search history.

(56) References Cited

U.S. PATENT DOCUMENTS

| 5,577,969 | A |   | 11/1996 | Watarai |
| 6,038,923 | A | * | 3/2000 | Lin ................................. 73/488 |
| 6,144,125 | A |   | 11/2000 | Birkestrand et al. |
| 6,276,230 | B1 | * | 8/2001 | Crum et al. .................. 74/551.9 |
| 6,342,769 | B1 | * | 1/2002 | Birkestrand et al. .......... 318/139 |
| 6,377,016 | B1 | * | 4/2002 | Strong .......................... 318/653 |
| 7,841,255 | B2 |   | 11/2010 | Fuji |
| 2011/0303041 | A1 |   | 12/2011 | Cheng et al. |
| 2014/0260753 | A1 | * | 9/2014 | Mueller et al. .............. 74/484 R |

FOREIGN PATENT DOCUMENTS

| DE | 102012204189 A1 |   | 9/2012 |
| DE | 202012104005 U1 |   | 12/2012 |
| DE | 202013002490 U1 |   | 7/2014 |
| EP | 1630095 A2 |   | 3/2006 |
| EP | 2 682 332 A1 | * | 1/2014 |
| WO | 2005021366 A1 |   | 3/2005 |

OTHER PUBLICATIONS

European Search Report dated Apr. 15, 2014 for European application No. EP14159260.

* cited by examiner

*Primary Examiner* — Ruth Ilan
(74) *Attorney, Agent, or Firm* — Ohlandt, Greeley, Ruggiero & Perle, LLP

(57) ABSTRACT

A bicycle handle system comprises a handle element to be fastened on a handlebar. Further, a control element is arranged laterally next to the handle element. The control element serves to control an electric auxiliary motor. The control element has a bearing element on which an actuation element can be turned. The bearing element has switching tabs connected thereto. By turning the actuation element, the switching tabs actuate electric switching elements.

13 Claims, 1 Drawing Sheet

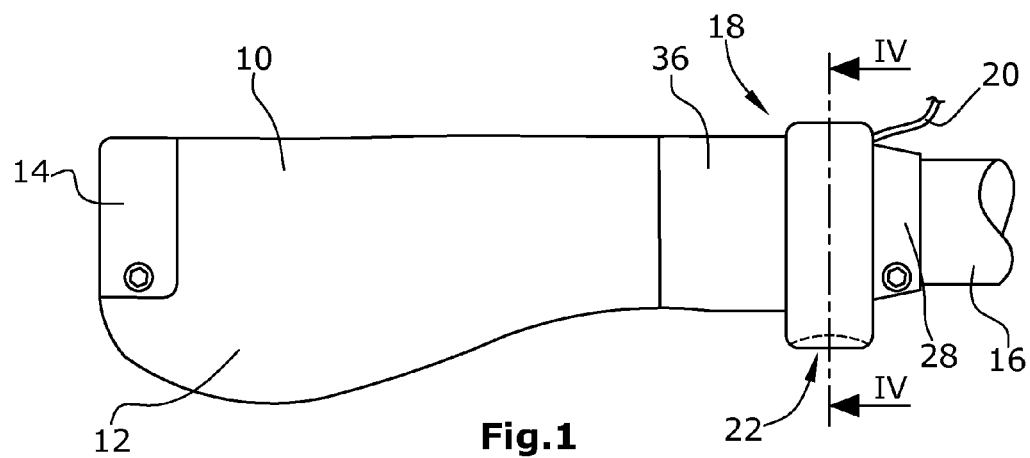
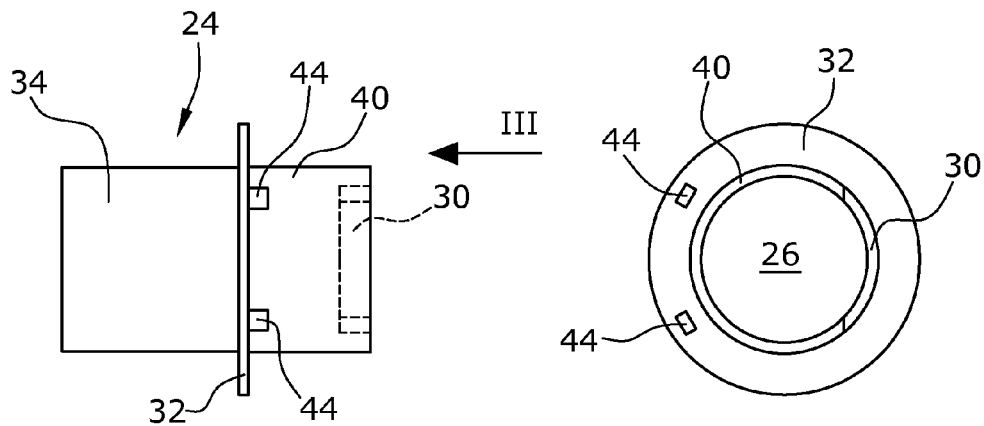
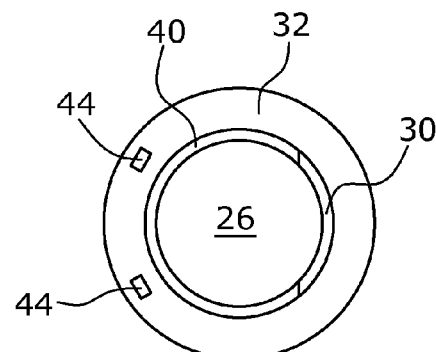
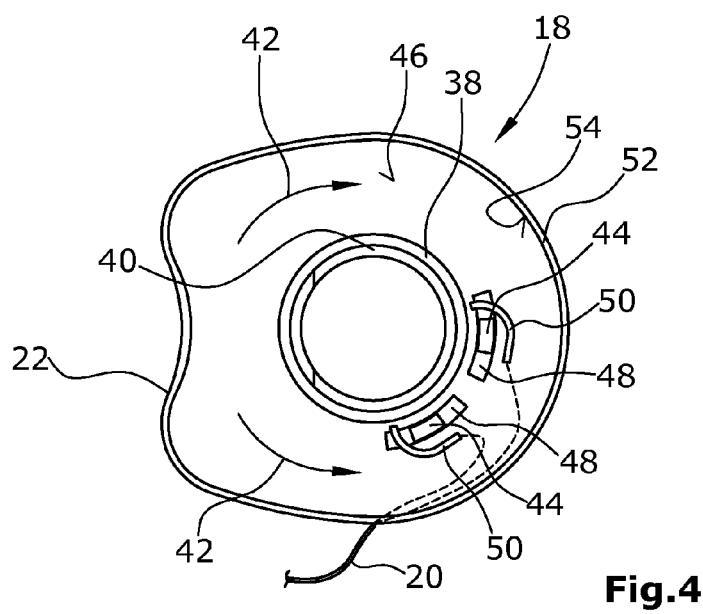

BICYCLE HANDLE SYSTEM

CROSS REFERENCE TO RELATED APPLICATIONS

The present disclosure claims the priority of German Utility Model Application no. DE 20 2013 002 490.9 filed on Mar. 15, 2013, the disclosures of which are incorporated herein by reference.

BACKGROUND

1. Field of the Disclosure

The disclosure relates to a bicycle handle system for fastening to a bicycle handlebar.

2. Description of the Prior Art

The handlebars of electrically assisted bicycles are provided with control elements for controlling the electric motor. These control elements are fastened on the handlebar by clamping, for example. Since these are control elements that are independent of the handle, they can be mounted on the handlebar laterally next to the conventional bicycle handle. Such control elements have the disadvantage that their operation often requires taking a hand from a bicycle handle. It is necessary to at least partially release the handle, for instance, in order to actuate a switch on the control element with the thumb. This means a reduction in safety, since, for example, when riding over a bump or the like there is a risk of the hand slipping from the handle. Moreover, the ergonomics of such control elements is not or only slightly adapted to the posture of the hand of a user while riding on a bicycle.

SUMMARY

It is an object of the disclosure to provide a bicycle handle system, in which a control element having at least one electric switch for controlling an electric auxiliary motor can be actuated in a simple manner.

The bicycle handle system of the disclosure comprises a handle element adapted to be mounted to or on a bicycle handlebar. According to the disclosure, a control element for controlling electric auxiliary motor of the bicycle is provided in particular laterally next to the handle element that may be slightly shorter than conventional handles, if need be. In the mounted state, the control element is preferably arranged within the handle element so that it is preferably possible to actuate the control element in particular with the thumb without having to release the hand from the handle element. The control element allows changing the assisting power of the auxiliary motor. According to the disclosure, the control element comprises an actuation element. The actuation element is rotatably connected with a bearing element. For example, the bearing element can be sleeve-shaped or have a sleeve-shaped extension and be fixed on the bicycle handlebar either directly or indirectly. Thereby, the actuation element can be rotated on the bearing element. A rotation of the actuation element on or in the bearing element, a rotation of the actuation element relative to the bearing element, causes an actuation of the electric switching element.

According to the disclosure, this is achieved in a first, particularly preferred embodiment by a switching tab provided on the actuation element. By turning the actuation element relative to the bearing element, the at least one switching tab acts on the at least one electric membrane button. The same principle of the present disclosure can be realized by arranging the at least one switching tab on the bearing element or in particular on the fixing element fastened on the handlebar, and by providing the at least one electric membrane button, on which the at least one switching element acts, on the actuation element. What is of relevance is the relative movement between the at least one switching tab and the corresponding at least one membrane button, the switching being effected by the relative movement. According to the disclosure, it is thus possible by simply turning the actuation element through a predetermined angle or by pivoting the control element, to control the electric auxiliary motor with respect to the assisting power.

In this regard, it is preferred that the actuation element can be turned in two different directions on the bearing element and that the assisting power from the auxiliary motor is thereby reduced or increased. Preferably, two electric switching elements are provided for this purpose, one of the switching elements serving to increase the assisting power and the other switching element serving to reduce the same. Both electric switching elements can be acted upon by one switching tab or by two separate switching tabs.

The fixing element, which in an alternative embodiment is connected with the at least one switching tab, can have additional functions. For example, the fixing element may be designed as a clamping element and serve to fix the bearing element on the handlebar.

In a particularly preferred development of the disclosure, the actuation element comprises a sliding element arranged for rotation on the bearing element. In this embodiment, the sliding element forms a plain bearing together with the bearing element. As an alternative, rolling elements, such as balls, can be provided between these two elements. It is particularly preferred that the bearing element has a cylindrical inner diameter that substantially corresponds to the outer diameter of the bicycle handlebar so that the bearing element can be fixed on the bicycle handlebar in a simple manner, for example by means of a clamping means such as a clip or the like. The fixation of the bearing element can also be achieved through a connection with the handle element which in this case will be fixed on the bicycle handlebar. A preferred embodiment of the outer surface of the bearing element forming the sliding surface is preferably also shaped substantially cylindrically. Correspondingly, it also preferred that the sliding element has a substantially cylindrical inner surface directed towards the bearing element. In this regard, it is preferred that the sliding element is formed integrally with the control element, in particular as an injection molded part.

In another preferred embodiment, the at least one switching tab is connected with the bearing element or the fixing element and protrudes into the actuation element. In this context, it is further preferred that a side wall of the actuation element comprises at least one slit-shaped opening through which the at least one switching tab protrudes. If at least two switching tabs are provided, it is preferred to provide one slit-shaped opening for each switching tab. In this preferred embodiment the actuation element can be hollow in the manner of a housing so that the at least one switching tab is arranged between an outer wall of the housing and the sliding element. Thereby, a compact structure can be achieved.

For a control element that is in particular designed in the manner of a housing, it is further preferred that at least one, in particular both switching elements are arranged within the control element. Here, an arrangement on an inner side of a control element outer wall is preferred.

In order to achieve the simplest possible actuation of the control element, in particular a simple turning of the actuation element on the bearing element, the control element comprises a switching depression. In the mounted state, the latter is directed in particular in the direction of the user so that it is possible, in a simple manner, to actuate the control element with the thumb via the corresponding switching depression without having to take the hand off the bicycle handle. In particular, it is preferred that the at least one switching tab is arranged substantially opposite the switching depression. Especially in the embodiment in which the switching tab is connected with the bearing element or the fixing element, this has the advantage that no space must be provided for the at least one switching tab in the area of the switching depression. Thus, the control element can be of an ergonomic and compact design in the area of the switching depression. In a preferred embodiment, there is ample space in the portion of the control element averted from the user. Instead of a switching depression, it is possible to provide a switching protrusion, for instance, which is directed in particular towards the user and can be actuated in particular with the thumb.

BRIEF DESCRIPTION OF THE DRAWINGS

A full and enabling disclosure of the present disclosure, enabling one of ordinary skill in the art to carry out the disclosure, is set forth in greater detail in the following description, including reference to the accompanying drawing in which FIG. 1 is a schematical top plan view of a bicycle handlebar together with a control element, FIG. 2 is a schematic top plan view of the bearing element, FIG. 3 is a schematic side elevational view of the bearing element in the direction of the arrow III in FIG. 2, and FIG. 4 is a schematic sectional view of the control element and the bearing element along line IV-IV in FIG. 1.

DESCRIPTION OF PREFERRED EMBODIMENTS

The drawing figures are intended to illustrate the general manner of construction and are not necessarily to scale. In the detailed description and in the drawing figures, specific illustrative examples are shown and herein described in detail. It should be understood, however, that the drawing figures and detailed description are not intended to limit the disclosure to the particular form disclosed, but are merely illustrative and intended to teach one of ordinary skill how to make and/or use the disclosure claimed herein.

In a preferred embodiment of the bicycle handle system of the present disclosure a handle element 10 is provided. The handle element 10 has a protrusion 12 for supporting the palm of the hand and is fastened on the bicycle handle bar by a clamping means 14. Such a handle element is described in EP 1 537 014, for example. The handle element is guided on the handlebar by means of the clamping means 14. An actuation element 18 is arranged on a side that is the inner side with respect to the handle element 10. The actuation element 18 is at least partially pivotable or rotatable about the handlebar 16. Thereby, an electric switch is actuated that controls an auxiliary motor connected with the control element via a wire 20. The connection may also be wireless. In the embodiment illustrated, the actuation element 18 is turned by means of a thumb placed in a switching depression 22 of the actuation element and by moving the thumb upward or downward.

The actuation element 18 is arranged on a bearing element 24 (FIG. 2). The bearing element 24 has a cylindrical opening 26 (FIG. 3) having the outer diameter of the handlebar 16. By means of a fixing element 28 (FIG. 1) in the form of a clamp in cooperation with a recess 30 in the bearing element, the bearing ring can be fixed on the handlebar 16. The actuation element 18 is arranged on the right or inner side of an annular abutment ring 32, as illustrated in FIG. 2. An opposite cylindrical part 34 of the bearing element 24 either protrudes directly into the handle element 10 or is partially surrounded by another, substantially cylindrical handle part 36 so that the cylindrical extension 34 protrudes only partially into the handle element 10. For example, other electronic components or the like can be housed in the cylindrical handle part 36.

In the embodiment illustrated the actuation element 18 comprises an inner cylindrical extension 38 forming a sliding element. The same surrounds the cylindrical extension 40 of the bearing element 24 so that it is possible to turn or pivot the control element on the cylindrical extension 40 of the bearing element 24 as indicated by the arrows 42. In the embodiment illustrated, the actuation element 18 is actuated using the thumb placed in the depression 22.

In the embodiment illustrated, the circular abutment ring 32 of the bearing element 24 is provided with two switching tabs 44 extending into the actuation element 18. For this purpose, a side wall 46 of the actuation element 18 is provided with slots 48. Further, two electric switching elements 50 are arranged within the actuation element 18. The same are connected with the wire 20. In the embodiment illustrated, the electric switching elements 50 are arranged between the sliding element 38 and an outer wall 52 of the actuation element 18. Specifically, the electric switching elements 50 are fastened on an inner side 54 of the outer wall 52. The actuation element 18 can be closed by a cover not illustrated that is situated opposite the side wall 46.

Turning the control element 18 in the direction of one of the two arrows 42 causes a turning of the electric switching elements 50 connected with the actuation element 18. Thus, one of the two electric elements 50 comes to contact one of the two switching tabs 44, the switching tabs 44 being stationary because of their connection with the bearing element 24. Thereby, an electric contact can be made and a corresponding switching signal can be generated.

All references cited herein are incorporated by reference to the full extent to which the incorporation is not inconsistent with the express teachings herein.

Although the disclosure has been described and illustrated with reference to specific illustrative embodiments thereof, it is not intended that the disclosure be limited to those illustrative embodiments. Those skilled in the art will recognize that variations and modifications can be made without departing from the true scope of the disclosure as defined by the claims that follow. It is therefore intended to include within the disclosure all such variations and modifications as fall within the scope of the appended claims and equivalents thereof.

What is claimed is:

1. A bicycle handle system comprising:
a control element for controlling an electric auxiliary motor, said element being adapted to be fastened on a bicycle handlebar next to a handle element,
wherein
the control element comprises an actuation element rotatable on a bearing element, and
at least one switching tab is adapted to be fastened to the handlebar, the at least one switching tab acting on an electric switching element when the actuation element is turned relative to the bearing element,
wherein the at least one switching tab is connected with the bearing element and protrudes into the actuation element.

2. The bicycle handle system of claim 1, wherein the electric switching element is connected with the actuation element.

3. The bicycle handle system of claim 1, wherein the actuation element surrounds the bearing element.

4. The bicycle handle system of claim 3, wherein the at least one switching tab is arranged radially between the sliding element and an outer wall of the actuation element.

5. The bicycle handle system of claim 3, wherein the actuation element comprises a cylindrical sliding element rotatable on the bearing element.

6. The bicycle handle system of claim 1, wherein the electric switching element is arranged within the actuation element.

7. The bicycle handle system of claim 6, wherein the electric switching element is arranged on an inner side of an outer wall of the actuation element.

8. The bicycle handle system of claim 1, wherein the actuation element comprises a switching depression for rotation relative to the bearing element.

9. The bicycle handle system of claim 8, wherein the at least one switching tab is arranged substantially opposite the switching depression.

10. The bicycle handle system of claim 1, wherein the at least one switching tab is provided at the bearing element.

11. A bicycle handle system comprising:
a control element for controlling an electric auxiliary motor, said element being adapted to be fastened on a bicycle handlebar next to a handle element,
wherein
the control element comprises an actuation element rotatable on a bearing element, and
at least one switching tab is adapted to be fastened to the handlebar, the at least one switching tab acting on an electric switching element when the actuation element is turned relative to the bearing element, wherein a side wall of the actuation element has a slot-shaped opening through which the at least one switching tab protrudes.

12. The bicycle handle system of claim 11, wherein the at least one switching tab is provided at the bearing element.

13. The bicycle handle system of claim 11, wherein the actuation element comprises a switching depression for rotation relative to the bearing element.

* * * * *